United States Patent [19]

Smith et al.

[11] Patent Number: 5,198,478
[45] Date of Patent: Mar. 30, 1993

[54] ALKALINE RESOL PHENOL-ALDEHYDE RESIN BINDER COMPOSITIONS

[75] Inventors: Garry Smith, Sutton Coldfield; Martin Bradley, Solihull, both of England

[73] Assignee: Foseco International Limited, Birmingham, England

[21] Appl. No.: 833,697

[22] Filed: Feb. 11, 1992

[30] Foreign Application Priority Data

Mar. 13, 1991 [GB] United Kingdom ............... 9105314

[51] Int. Cl.$^5$ ............................ C08J 5/14; B22C 1/16; B22C 1/20
[52] U.S. Cl. .................................. 523/145; 523/143; 523/146; 523/147; 524/443; 524/594; 524/596; 525/506
[58] Field of Search ............... 523/145, 146, 147, 143; 528/129, 138, 139; 524/594, 596, 443; 525/506

[56] References Cited
FOREIGN PATENT DOCUMENTS 0323096 7/1989 European Pat. Off. .
56-112979 9/1981 Japan .

OTHER PUBLICATIONS

Rose, Arthur & Elizabeth, The Condensed Chemical Dictionary, 7th ed. van Nostrand Reinhold Co.

Primary Examiner—John Kight, III
Assistant Examiner—Richard L. Jones
Attorney, Agent, or Firm—Nixon & Vanderhye

[57] ABSTRACT

A binder composition for producing articles of bonded particulate material such as foundry moulds or cores comprises an alkaline aqueous solution of a resol phenol-aldehyde resin, an oxyanion which can form a stable complex with the resin, and pyrrolidone or an N-substituted pyrrolidone, and the amount of alkali present in the solution is sufficient to substantially prevent stable complex formation between the resin and the oxyanion. Bonded articles are produced by passing carbon dioxide gas through articles formed from a mixture of particulate material and the binder composition so as to produce stable complex formation and curing of the resin.

13 Claims, No Drawings

ALKALINE RESOL PHENOL-ALDEHYDE RESIN BINDER COMPOSITIONS

This invention relates to alkaline resol phenol-aldehyde binder compositions and their use in the production of articles of bonded particulate material such as foundry moulds or cores.

U.S. Pat. Nos. 4,985,489 and 4,977,209 describes a binder composition comprising an alkaline aqueous solution of a resol phenol-aldehyde resin and an oxyanion which can form a stable complex formation between the resin and the oxyanion. U.S. Pat. Nos. 4,985,489 and 4,977,209 also describes a process for the production of an article of bonded particulate material, such as a foundry mould or core, in which a mixture of particulate material and the binder composition is formed to a desired shape, and carbon dioxide gas is then passed through the formed shape so as to cause the oxyanion to form a stable complex with the resin and thereby to cure the resin.

It has now been found that the performance of the binder composition can be improved if the binder composition also contains pyrrolidone or an N-substituted pyrrolidone.

According to the present invention there is provided a binder composition comprising an alkaline aqueous solution of a resol phenol-aldehyde resin and an oxyanion which can form a stable complex with the resin, the amount of alkali present in the solution being sufficient to substantially prevent stable complex formation between the resin and the oxyanion, wherein the binder composition also contains pyrrolidone or an N - substituted pyrrolidone.

According to a further feature of the invention there is provided a process for the production of an article of bonded particulate material comprising forming to the desired shape a mixture of particulate material and a binder composition comprising an alkaline aqueous solution of a resol phenol-aldehyde resin, an oxyanion which can form a stable complex with the resin, and pyrrolidone or an N - substituted pyrrolidone, and passing carbon dioxide gas through the formed shape so as to cause the oxyanion to form a stable complex with the resin, and thereby to cure the resin.

The binder composition and the process of the invention are of particular value for making foundry moulds and cores and it is with reference to that application that the invention will be described.

Suitable phenol-aldehyde resins and oxyanions for use in the binder compositions of the invention, and suitable methods for producing the phenol-aldehyde resin are described in U.S. Pat. Nos. 4,985,489 and 4,977,209 the disclosure of which is incorporated herein by reference.

Examples of suitable N substituted pyrrolidones include N-methyl-2-pyrrolidone, N-ethyl-2-pyrrolidone and N-(2-hydroxyethyl)-2-pyrrolidone.

The optimum amount of pyrrolidone or an N-substituted pyrrolidone contained in the binder composition will vary depending on the composition of the resin and on the particular pyrrolidone compound used, but will usually be within the range of 1%–10%, preferably 2-5%, by weight based on the weight of the binder composition.

The presence of the pyrrolidone compound may have one or more beneficial effects on the performance of the binder composition as a binder for making foundry moulds and cores, depending on the composition of the particular resin and the particular pyrrolidone compound used.

The beneficial effects include:
(i) improved mould or core strength immediately after gassing with carbon dioxide gas.
(ii) improved strength after gassed moulds or cores have been stored before use, for example for up to 24 hours or longer.
(iii) improved strength of moulds or cores which have been coated with an alcohol based coating which has been dried by burning off the alcohol, prior to storage of the moulds or cores.
(iv) improved mixed sand flowability.
(v) improved mould or core surface finish and edge hardness.

The binder composition of the invention preferably also contains a silane such as gamma-aminopropyltriethoxysilane, N-(2-aminoethyl)-3-aminopropyltrimethoxysilane, phenol trimethoxysilane or gamma-glycidoxypropyltrimethoxysilane usually in an amount of 0.2% to 1.0% by weight based on the weight of the binder composition.

The following Examples will serve to illustrate the invention:

EXAMPLE 1

A resol phenol-formaldehyde resin was synthesised having the following composition:

| | |
|---|---|
| phenol | 800.00 g |
| 91% W/W paraformaldehyde | 642.20 g |
| 50% W/W sodium hydroxide solution | 40.85 g |
| F:P molar ratio | 2.3:1 |
| OH:P molar ratio | 0.06:1 |
| Water in starting composition | 5.2% W/W |

The following procedure was used:
1. Charge and melt phenol
2. Charge paraformaldehyde and part of the sodium hydroxide solution and heat to 60°–65° C. at a rate of 1° C. per minute
3. Cool to counteract exothermic reaction and maintain at 60°–65° C. while adding the remainder of the sodium hydroxide solution over a period of 1 hour
4. Heat to 75° C. at a rate of 1° C. per minute
5. Maintain at 75° C. for 30 minutes
6. Heat to 85° C. at a rate of 1° C. per minute
7. Maintain at 85° C. for sufficient time for the resin to reach a viscosity of 4000–6000 cp at 25° C. as measured on a 25 g sample diluted with 15 g of 50% w/w potassium hydroxide solution using Paint Research Association Bubble Viscosity Tubes.

The resin was used to produce a base binder (1) having the following composition by weight:

| | |
|---|---|
| resin | 25 parts |
| 50% W/W potassium hydroxide solution | 35 parts |
| borax | 5.5 parts |
| gammaaminopropyltriethoxysilane | 0.39 parts |

The potassium hydroxide solution was added to the resin, the temperature rise due to exothermic reaction was controlled and the resin was cooled. The borax was added and mixed into the resin until it had dissolved.

The silane was then added at a temperature of below 30° C.

Binder composition 2 was prepared from some of the base binder 1 by dissolving 2% by weight of N-methyl-2-pyrrolidone in 98% by weight of base binder 1.

Both binders were tested as binders for foundry sand using the following procedure:

3% by weight of the binder based on the weight of sand was mixed with CHELFORD 60 silica sand (AFS Fineness No. 62) and the mixture was used to prepare standard AFS 50 mm ×50 mm diameter cylindrical cores. The sand temperature was 19°-20° C. The cores were hardened by the passage of carbon dioxide gas for various times at o.35 kg/cm² line pressure and a 6.0 liters per minute flow rate.

Some of the cores were tested immediately after gassing on a George Fischer Universal Strength Machine Type PFA fitted with a High-Dry Compressive Strength Attachment Type PHD. Some were tested after storage for 24 hours in dry storage conditions (temperature 18°-21° C., relative humidity 35-40%) and others were tested after storage for 24 hours in humid storage conditions (temperature 26°-28° C., relative humidity 80-85%).

The results obtained are tabulated in Table 1 below.

TABLE 1

| BINDER | | COMPRESSION STRENGTH (kg/cm²) | |
|---|---|---|---|
| | | 1 | 2 |
| AS GASSED | | | |
| GASSING TIME | 30 S | 12.4 | 19.4 |
| | 60 S | 16.1 | 24.3 |
| | 120 S | 17.7 | 25.9 |
| DRY STORAGE | | | |
| GASSING TIME | 30 S | 15.0 | NO DATA |
| | 60 S | 16.5 | 29.2 |
| | 120 S | 17.0 | 32.1 |
| HUMID STORAGE | | | |
| GASSING TIME | 30 S | 15.7 | 26.0 |
| | 60 S | 15.8 | 25.0 |
| | 120 S | 14.7 | 25.1 |

EXAMPLE 2

Using some of the base binder 1 of Example 1 a binder composition 3 was prepared by dissolving 5% by weight of N-methyl-2-pyrrolidone in 95% by weight of base binder 1.

Binders 1 and 3 were tested as described in Example 1 except that for the storage tests the test cores were stored for 4 days instead of 24 hours.

The results obtained are tabulated in Table 2 below.

TABLE 2

| BINDER | | COMPRESSION STRENGTH (kg/cm²) | |
|---|---|---|---|
| | | 1 | 2 |
| AS GASSED | | | |
| GASSING TIME | 30 S | 12.8 | 18.7 |
| | 60 S | 15.5 | 22.0 |
| | 120 S | 17.6 | 24.1 |
| DRY STORAGE | | | |
| GASSING TIME | 30 S | 19.9 | 35.0 |
| | 60 S | 21.0 | 46.0 |
| | 120 S | 21.1 | 49.0 |
| HUMID STORAGE | | | |
| GASSING TIME | 30 S | 15.5 | 24.0 |
| | 60 S | 14.9 | 24.3 |
| | 120 S | 14.9 | 25.0 |

EXAMPLE 3

A series of binders 4-10 were prepared from base binder 1 containing various proportions between 1% and 10% by weight based on the weight of the binder of N-methyl-2-pyrrolidone (NMP).

The binders were tested using the same procedure and under the same conditions as in example 1 except that the sand temperature was 18°-19° C., the ambient storage temperature was 17°-19° C., and the humid storage conditions were 25°-27° C. and 80-95% relative humidity.

The results are tabulated in Tables 3, 4 and 5 below:

TABLE 3

| BINDER | NMP (WT %) | COMPRESSION STRENGTH (kg/cm²) AS GASSED FOR GASSING TIME | | |
|---|---|---|---|---|
| | | 30 S | 60 S | 120 S |
| 4 | 1 | 13.8 | 16.0 | 18.0 |
| 5 | 2 | 15.4 | 18.3 | 21.5 |
| 6 | 3 | 16.0 | 18.6 | 22.1 |
| 7 | 4 | 16.0 | 18.1 | 20.8 |
| 8 | 5 | 14.9 | 17.4 | 18.4 |
| 9 | 7.5 | 12.8 | 14.9 | 16.7 |
| 10 | 10 | 9.9 | 12.3 | 13.8 |

TABLE 4

| BINDER | NMP (WT %) | COMPRESSION STRENGTH (kg/cm²) AFTER DRY STORAGE FOR GASSING TIME | | |
|---|---|---|---|---|
| | | 30 S | 60 S | 120 S |
| 4 | 1 | 24.4 | 24.1 | 25.2 |
| 5 | 2 | 30.0 | 27.8 | 31.7 |
| 6 | 3 | 33.0 | 35.5 | 36.0 |
| 7 | 4 | 40.0 | 35.0 | 35.5 |
| 8 | 5 | 37.0 | 39.5 | 37.5 |
| 9 | 7.5 | 42.5 | 38.5 | 40.5 |
| 10 | 10 | 41.5 | 38.5 | 39.0 |

TABLE 5

| BINDER | NMP (WT %) | COMPRESSION STRENGTH (kg/cm²) AFTER HUMID STORAGE FOR GASSING TIME | | |
|---|---|---|---|---|
| | | 30 S | 60 S | 120 S |
| 4 | 1 | 17.4 | 17.1 | 19.2 |
| 5 | 2 | 21.3 | 22.6 | 22.5 |
| 6 | 3 | 23.9 | 24.0 | 24.1 |
| 7 | 4 | 24.1 | 24.6 | 24.4 |
| 8 | 5 | 24.9 | 24.5 | 24.8 |
| 9 | 7.5 | 28.4 | 28.6 | 29.8 |
| 10 | 10 | 25.0 | 25.6 | 23.9 |

The results in the Examples demonstrate the benefits obtained in terms of core strength by the addition of N-methyl-2-pyrrolidone to the base resin. The optimum addition for as-gassed strength improvement is in the 2-5% by weight range of addition but the strength of cores which have been stored is still improved at higher rates of addition up to 10% by weight.

EXAMPLE 4

A series of binders 11-14 was prepared from base binder 1 containing 1% by weight based on the weight of the binder of respectively 2-pyrrolidone, N-ethyl-2-pyrrolidone, N-methyl-2-pyrrolidone and N-(2 hydroxyethyl)-2-pyrrolidone. A further series 15-18 was prepared containing 5% by weight based on the weight of the binder using the same pyrrolidone compounds.

Both series of binders were tested in comparison with binder 1 as described in Example 1 except that for the storage tests the test cores were stored for 3 days in dry storage conditions of temperature 16°–17° C. and relative humidity 40–50%.

The results obtained are tabulated in Tables 6 and 7 below:

TABLE 6

| BINDER | COMPRESSION STRENGTH ($kg/cm^2$) AS GASSED FOR GASSING TIME | | |
|---|---|---|---|
| | 30 S | 60 S | 120 S |
| 1 | 10.1 | 12.5 | 14.1 |
| 11 | 11.3 | 14.3 | 16.8 |
| 12 | 12.4 | 16.2 | 18.5 |
| 13 | 13.8 | 17.7 | 19.8 |
| 14 | 14.3 | 15.9 | 20.0 |
| 1 | 10.6 | 13.6 | 17.5 |
| 15 | 14.0 | 15.5 | 18.2 |
| 16 | 14.1 | 14.6 | 18.5 |
| 17 | 16.4 | 15.9 | 18.1 |
| 18 | 14.0 | 16.7 | 18.9 |

TABLE 7

| BINDER | COMPRESSION STRENGTH ($kg/cm^2$) AFTER DRY STORAGE FOR GASSING TIME | | |
|---|---|---|---|
| | 30 S | 60 S | 120 S |
| 1 | 16.8 | 18.6 | 18.0 |
| 11 | 22.2 | 23.2 | 24.7 |
| 12 | 25.8 | 23.0 | 30.4 |
| 13 | 26.2 | 29.0 | 33.5 |
| 14 | 21.3 | 28.6 | 28.8 |
| 1 | 16.7 | 20.2 | 19.1 |
| 15 | 32.6 | 34.0 | 35.0 |
| 16 | 46.0 | 39.0 | 43.0 |
| 17 | 40.0 | 46.0 | 42.0 |
| 18 | 38.0 | 39.0 | 38.0 |

The pyrrolidone and N-substituted pyrrolidones gave similar as-gassed strengths but in terms of strength on dry storage the N-substituted pyrrolidones were generally superior to pyrrolidone itself particularly at the 5% addition.

We claim:

1. A binder composition for forming foundry molds and cores, comprising:
   an oxyanion;
   an alkaline aqueous solution of a resol phenol-aldehyde resin and the alkali being present in an amount to be substantially prevent the formation of stable complexes between the resin and the oxyanion;
   a pyrrolidone or an N-substituted pyrrolidone in an amount sufficient to improve foundry mold or core compression strength immediately after gassing with carbon dioxide gas; and
   wherein the binder composition produces foundry molds and cores having improved strength, surface finish and edge hardness.

2. A binder composition according to claim 1 wherein the pyrrolidone or N-substituted pyrrolidone is present in an amount of 1% to 10% by weight based on the wight of the binder composition.

3. A binder composition according to claim 1 wherein the pyrrolidone or N-substituted pyrrolidone is present in an amount of 2% to 5% by weight based on the weight of the binder composition.

4. A binder composition according to claim 1 wherein the oxyanion is borate.

5. A binder composition according to claim 1 wherein the N-substituted pyrrolidone is N-methyl-2-pyrrolidone, N-ethyl-2-pyrrolidone, or N-(2-hydroxyethyl)-2-pyrrolidone.

6. A binder composition according to claim 1 wherein the composition contains in addition a silane.

7. A binder composition according to claim 6 wherein the silane is gammaaminopropyltriethoxysilane, N-(2-aminoethyl)-3-aminopropyltrimethoxysilane, phenol trimethoxysilane or gammaglycidoxypropyltrimethoxysilane.

8. A binder composition according to claim 6 wherein the amount of silane present is from 0.25% to 1.0% by weight based on the weight of the binder composition.

9. A process for the production of an article of bonded particulate material, comprising the steps of:
   (i) forming a mixture of a binder and particulate material to a desired shape, the binder comprising:
      an alkaline aqueous solution of a resol phenol-aldehyde resin;
      an oxyanion which can form a stable complex with the resin; and
      a pyrrolidone or an N-substituted pyrrolidone in an amount sufficient to improve foundry mold or core compression strength immediately after gassing with carbon dioxide gas; and
   (ii) passing carbon dioxide gas through the formed shape so as to cause the oxyanion to form a stable complex with the resin; and
   (iii) curing the resin to form an article of bonded particulate material.

10. A process according to claim 9 wherein the oxyanion is borate.

11. A process according to claim 9 wherein the pyrrolidone or N-substituted pyrrolidone is present in an amount of 1% to 10% by weight based on the weight of the binder composition.

12. A process according to claim 9 wherein the pyrrolidone or N-substituted pyrrolidone is present in an amount of 2% to 5% by weight based on the weight of the binder composition.

13. A process according to claim 9 wherein the binder composition contains a silane.

* * * * *